United States Patent
Campbell et al.

(10) Patent No.: US 12,541,566 B1
(45) Date of Patent: Feb. 3, 2026

(54) RANDOMIZED QUANTUM ALGORITHM FOR STATISTICAL PHASE ESTIMATION

(71) Applicant: Amazon Technologies, Inc., Seattle, WA (US)

(72) Inventors: Earl Terence Campbell, Sheffield (GB); Mario Andrea Berta, Los Angeles, CA (US); Kianna Wan, Redwood City, CA (US)

(73) Assignee: Amazon Technologies, Inc, Seattle, WA (US)

( * ) Notice: Subject to any disclaimer, the term of this patent is extended or adjusted under 35 U.S.C. 154(b) by 1096 days.

(21) Appl. No.: 17/508,344

(22) Filed: Oct. 22, 2021

(51) Int. Cl.
- G06N 10/60 (2022.01)
- G06F 17/14 (2006.01)
- G06F 17/17 (2006.01)
- G06F 111/10 (2020.01)

(52) U.S. Cl.
CPC ............ G06F 17/141 (2013.01); G06F 17/17 (2013.01); G06N 10/60 (2022.01); G06F 2111/10 (2020.01)

(58) Field of Classification Search
CPC .... G06F 17/141; G06F 17/17; G06F 2111/10; G06N 10/60
See application file for complete search history.

(56) References Cited

U.S. PATENT DOCUMENTS

| | | | |
|---|---|---|---|
| 2019/0220497 A1* | 7/2019 | Wiebe | G06N 10/60 |
| 2019/0362270 A1* | 11/2019 | Haener | G06N 10/70 |
| 2020/0279185 A1* | 9/2020 | Wiebe | G06N 3/06 |
| 2020/0349457 A1* | 11/2020 | Low | G06N 10/60 |
| 2023/0081927 A1* | 3/2023 | Zhang | G06N 10/60 |
| | | | 708/446 |

OTHER PUBLICATIONS

Van den Berg et al. "Circuit optimization of Hamiltonian simulation by simultaneous diagonalization of Pauli clusters", arXiv: 2003.13599v2 [quant-ph] Sep. 5, 2020, pp. 28.*

A. Y. Kitaev, A. Shen, M. N. Vyalyi, and M. N. Vyalyi, "Classical and Quantum Computation" (American Mathematical Soc., vol. 47, 2002), DOI: http://dx.doi.org/10.1090/gsm/047, pp. 1-274.

T. E. O'Brien, B. Tarasinski, and B. M. Terhal, "Quantum phase estimation of multiple eigenvalues for small-scale (noisy) experiments", New Journal of Physics 21, 023022, Published by IOP Publishing Ltd on behalf of the Institute of Physics and Deutsche Physikalische Gesellschaft (2019), pp. 1-28.

A. Dutkiewicz, B. M. Terhal, and T. E. O'Brien, "Heisenberg-limited quantum phase estimation of multiple eigenvalues with a single control qubit", arXiv preprint arXiv:2107.04605 (2021), pp. 1-27.

(Continued)

*Primary Examiner* — Li Wu Chang
(74) *Attorney, Agent, or Firm* — Alexander A. Knapp; Kowert, Hood, Munyon, Rankin & Goetzel, P.C.

(57) ABSTRACT

A system and method for estimating values of an operator, such as energy levels of a Hamiltonian, is disclosed. The estimation is performed in a way such that the runtime of performing the estimation is independent of a complexity of the operator, e.g., a number of terms in the Hamiltonian. Also, errors can be statistically suppressed by performing additional sampling, due to a lack of biased error in the estimator. Additionally, samples may be tested using only a single ancilla qubit.

20 Claims, 7 Drawing Sheets

(56) References Cited

OTHER PUBLICATIONS

L. Lin and Y. Tong, "Heisenberg-limited ground state energy estimation for early fault-tolerant quantum computers", arXiv preprint arXiv:2102.11340 (2021), pp. 1-24.
D. Poulin, M. B. Hastings, D. Wecker, N. Wiebe, A. C. Doherty, and M. Troyer, "The Trotter step size required for accurate quantum simulation of quantum chemistry", Quantum Information & Computation vol. 15, No. 361, Rinton Press (2015), pp. 1-24.
R. Babbush, J. McClean, D. Wecker, A. Aspuru-Guzik, and N. Wiebe, "Chemical basis of Trotter-Suzuki errors in quantum chemistry simulation", Physical Review A 91, 022311 (2015), pp. 1-17.
I. D. Kivlichan, C. Gidney, D. W. Berry, N. Wiebe, J. McClean, W. Sun, Z. Jiang, N. Rubin, A. Fowler, A. Aspuru-Guzik, et al., "Improved Fault-Tolerant Quantum Simulation of Condensed-Phase Correlated Electrons via Trotterization", Quantum 4, 296 (2020), arXiv preprint https://arxiv.org/abs/1902.10673v4, pp. 1-45.
E. T. Campbell, "Early fault-tolerant simulations of the Hubbard model", arXiv preprint arXiv:2012.09238, (2020), pp. 1-15.
S. McArdle, E. Campbell, and Y. Su, "Exploiting fermion No. in factorized decompositions of the electronic structure Hamiltonian", arXiv preprint arXiv:2107.07238 (2021), pp. 1-36.
M. Motta, T. P. Gujarati, J. E. Rice, A. Kumar, C. Masteran, J. A. Latone, E. Lee, E. F. Valeev, and T. Y. Takeshita, "Quantum simulation of electronic structure with transcorrelated Hamiltonian: increasing accuracy without extra quantum resources", Physical Chemistry Chemical Physics, Issue 22, 24270, arXiv preprint https://arxiv.org/pdf/2006.02488.pdf, (2020), pp. 1-13.
S. McArdle and D. P. Tew, "Improving the accuracy of quantum computational chemistry using the transcorrelated method", arXiv preprint arXiv:2006.11181 (2020), pp. 1-13.
R. Babbush, C. Gidney, D. W. Berry, N. Wiebe, J. Mc-Clean, A. Paler, A. Fowler, and H. Neven, "Encoding electronic spectra in quantum circuits with linear T complexity", Physical Review X 8, 10.1103/physrevx.8.041015, Published by the American Physical Society (2018), pp. 1-36.
G. H. Low, V. Kliuchnikov, and L. Schaeer, "Trading Tgates for dirty qubits in state preparation and unitary synthesis", arXiv preprint arXiv:1812.00954 (2018), pp. 1-11.
R. Babbush, D. W. Berry, J. R. McClean, and H. Neven, "Quantum simulation of chemistry with sublinear scaling in basis size", npj Quantum Information 5, Article No. 92, (2019).
D. W. Berry, C. Gidney, M. Motta, J. R. McClean, and R. Babbush, "Qubitization of Arbitrary Basis Quantum Chemistry Leveraging Sparsity and Low Rank Factorization", Quantum vol. 3, p. 208, arXiv preprint arXiv:1902.02134v4 (2019), pp. 1-44.
V. von Burg, G. H. Low, T. ★ aner, D. S. Steiger, M. Reiher, M. Roetteler, and M. Troyer, "Quantum computing enhanced computational catalysis", Physical Review Research 3, 033055, Published by the American Physical Society (2021), pp. 1-16.
J. Lee, D. W. Berry, C. Gidney, W. J. Huggins, J. R. McClean, N. Wiebe, and R. Babbush, "Even More Efficient Quantum Computations of Chemistry Through Tensor Hypercontraction", PRX Quantum 2, 030305, Published by the American Physical Society, (2021), pp. 1-62.
E. Campbell, "Random Compiler for Fast Hamiltonian Simulation", Physical Review Letters 123, 070503, arXiv preprint arXiv:1811.08017v2, (2019), pp. 1-11.
I. D. Kivlichan, C. E. Granade, and N. Wiebe, "Phase estimation with randomized Hamiltonians", arXiv preprint arXiv:1907.10070 (2019), pp. 1-17.
Y. Ouyang, D. R. White, and E. T. Campbell, "Compilation by stochastic Hamiltonian sparsication", Quantum 4, 235, arXiv preprint rXiv:1910.06255v2 (2020), pp. 1-17.
A. M. Childs and N. Wiebe, "Hamiltonian simulation using linear combinations of unitary operations", Quantum Information & Computation 12, arXiv preprint arXiv:1202.5822v1, (2012), pp. 1-18.
D. W. Berry, A. M. Childs, R. Cleve, R. Kothari, and R. D. Somma, "Simulating Hamiltonian Dynamics with a Truncated Taylor Series",
Physical Review Letters vol. 114, Issue 9, 090502, © 2015 American Physical Society (2015), pp. 1-6.
F. Verstraete and J. I. Cirac, "Mapping local Hamiltonians of fermions to local Hamiltonians of spins", Journal of Statistical Mechanics: Theory and Experiment, vol. 2005, P09012, IOP Publishing Ltd (2005), arXiv preprint arXiv:cond-mat/0508353v3, pp. 1-7.
J. T. Seeley, M. J. Richard, and p. J. Love, "The Bravyi-Kitaev transformation for quantum computation of electronic structure", The Journal of Chemical Physics 137, 224109, © 2012 American Institute of Physics, pp. 1-17.
V. Havlcek, M. Troyer, and J. D. Whiteld, "Operator locality in the quantum simulation of fermionic models", Physical Review A 95, 10.1103/physreva.95.032332 (2017), arXiv preprint arXiv:1701.07072v1, pp. 1-10.
C. Derby, J. Klassen, J. Bausch, and T. Cubitt, "Compact fermion to qubit mappings", Physical Review B 104, 10.1103/physrevb.104.035118 (2021), arXiv preprint arXiv:2003.06939v2, pp. 1-8.
J. M. Martyn, Z. M. Rossi, A. K. Tan, and I. L. Chuang, "A grand unification of quantum algorithms", arXiv preprint arXiv:2105.02859 (2021), pp. 1-39.
A. Gilyen, Y. Su, G. H. Low, and N. Wiebe, "Quantum singular value transformation and beyond: exponential improvements for quantum matrix arithmetics", in Proceedings of the 51st Annual ACM SIGACT Symposium on Theory of Computing (2019) pp. 193-204, https://doi.org/10.1145/3313276.3316366.
J. van Apeldoorn, A. Gilyen, S. Gribling, and R. deWolf, "Quantum SDP-Solvers: Better upper and lower bounds", Quantum 4, 230 (2020), pp. 1-69.
E. Koridon, S. Yalouz, B. Senjean, F. Buda, T. E. O'Brien, and L. Visscher, "Orbital transformations to reduce the 1-horm of the electronic structure Hamiltonian for quantum computing applications", Physical Review Research 3, 033127 (2021), arXiv preprint arXiv:2103.14753v3, pp. 1-18.
Z. Li, J. Li, N. S. Dattani, C. J. Umrigar, and G. K.-L. Chan, "The electronic complexity of the ground-state of the femo cofactor of nitrogenase as relevant to quantum simulations", The Journal of Chemical Physics 150, 024302, Published under license by AIP Publishing (2019), pp. 1-5.
G. H. Low and I. L. Chuang, "Hamiltonian simulation by uniform spectral amplication", arXiv preprint arXiv:1707.05391 (Jul. 19, 2017), pp. 1-32.
S. Sachdeva and N. K. Vishnoi, "Faster Algorithms via Approximation Theory", now, Foundations and Trends in Theoretical Computer Science, vol. 9, No. 2 pp. 125-210 (2014).
V. Makis, A. Volodin, and M. Short, "Improved inequalities for the Poisson and binomial distribution and upper tail quantile functions", Hindawi Publishing Corp. ISRN Probability and Statistics, vol. 2013, 412958 (2013), pp. 1-7.
A. Bocharov, M. Roetteler, and K. M. Svore, "Efficient Synthesis of Universal Repeat-Until-Success Quantum Circuits", Physical Review Letters 114, 080502 (2015), arXiv preprint arXiv:1404.5320v2, pp. 1-15.
V. Kliuchnikov, D. Maslov, and M. Mosca, "Asymptotically Optimal Approximation of Single Qubit Unitaries by Clifford and T Circuits Using a Constant No. of Ancillary Qubits", Physical Review Letters 110, 190502 (2013), arXiv preprint arXiv:1212.0822v2, pp. 1-5.
D. Gosset, V. Kliuchnikov, M. Mosca, and V. Russo, "An algorithm for the T-count", Quantum Information & Computation 14, 1261 (2014), arXiv preprint arXiv:1308.4134v1, pp. 1-12.
A. Bocharov, M. Roetteler, and K. M. Svore, "Efficient Synthesis of Probabilistic Quantum Circuits with Fallback", Physical Review A 91, 052317 (2015), pp. 1-16.
N. J. Ross and P. Selinger, "Optimal ancilla-free Clifford+T approximation of z-rotations", Quantum Information & Computation 16, 901 (2016), arXiv preprint arXiv:1403.2975v3, pp. 1-40.
C. Gidney, "Halving the cost of quantum addition", Quantum 2, 74 (2018), arXiv preprint arXiv:1709.06648v3, pp. 1-6.
D. Kivlichan, J. McClean, N. Wiebe, C. Gidney, A. Aspuru-Guzik, G. K.-L. Chan, and R. Babbush, "Quantum Simulation of Electronic (56) References Cited

OTHER PUBLICATIONS

Structure with Linear Depth and Connectivity", Physical Review Letters 120, 110501, © 2018 American Physical Society, pp. 1-6.

* cited by examiner

RANDOMIZED QUANTUM ALGORITHM FOR STATISTICAL PHASE ESTIMATION

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and an apparatus for performing phase estimation of a complex system. For example, the phase estimation may involve determining one or more energy levels for a Hamiltonian, such as a ground state energy or other excitation energy levels. Said another way, in some embodiments, a phase estimation system or method, as disclosed herein, may be used to measure eigenvalues of a complex system, such as a Hamiltonian. The disclosed phase estimation technique has a complexity independent of the number of terms in the operator (e.g., Hamiltonian) for which the eigenvalues are being estimated. Additionally, the disclosed phase estimation technique has a runtime that is independent on a number of terms included in the operator (e.g., Hamiltonian) for which the eigenvalues are being estimated. Additionally, the quantum circuits used in the phase estimation technique include only a single ancilla beyond the qubits used to represent the unitary ($U^j$) being tested. Thus, the disclosed technique allows for error to be mitigated by collecting additional quantum computing results (e.g., data samples) without requiring increasing the circuit depth of the quantum circuits used to collect the data samples. Such an approach optimizes resources (e.g., quantum gates and qubits) required to perform the phase estimation process while allowing for statistical error reduction by repeating runs of less complex quantum circuits.

Quantum computers can be used to simulate dynamics and learn the spectra of quantum systems, such as interacting particles comprised in complex molecules or materials. The quantum systems, such as the complex molecules or materials, may be described by some Hamiltonian H. Phase estimation on a unitary of the form $U=e^{Ht}$ offers a reliable route to solving a common spectral problem involving computing energy levels, for example for electrons of a complex molecule or material. This can be done by preparing a trial state with non-trivial (e.g., not exponentially small) overlap (eta ($\eta$)) with the true energy eigenstate. In non-statistical phase estimation, each experimental run will return a single energy eigenvalue, with precision and success probability determined by the number of times U is used. In such non-statistical phase estimation, quantum circuits used to implement U may be rather complex. In statistical phase estimation, a single run of statistical phase estimation gives a sample of an estimator with expectation value ($U^j$) for some runtime j. This alone may not be enough to infer spectral properties. It may be necessary to conduct multiple runs with different j values and statistical analysis gives spectral information with a confidence that increases with the amount of data that is obtained.

Implementations of phase estimation statistical or non-statistical typically depend on the Hamiltonian sparsity L (e.g., the quantity of terms included in the Hamiltonian). For example, the sparsity L may represent the number of terms in the Hamiltonian when the Hamiltonian is decomposed in a suitable Hermitian basis, such as the Pauli basis. Some simple schemes for implementing U using Trotter formula have a gate complexity that is a function of the number of terms in the Hamiltonian, e.g., the sparsity or L. Such simple schemes can be prohibitively complex when applied to real-world problems such as modeling an electronic structure in chemistry. For example, for an N-orbital molecule, the number of terms in the Hamiltonian may be given by $N^4$, in which case the gate complexity is proportional to $N^4$. This may increase to $N^6$ for trans-correlated orbitals to better resolve electron-electron interactions. One approach to reduce gate complexity is to use a data-lookup oracle in qubitization-based implementations of phase estimation. However, such approaches require a large number of ancilla qubits to perform, which significantly increases qubit costs. Thus, an approach is needed with lower gate complexity and qubit costs that also produces low error rates.

In some embodiments, the disclosed techniques combine statistical phase estimation with random compilation of each $U^j$ instance. The disclosed algorithm is doubly random in the sense that it randomly samples $U^j$ and then approximates $U^j$ using a random gate sequence. In such a technique, the compilation error can be expressed in terms of statistical noise that is suppressed by collecting more data samples, e.g., performing more Hadamard tests using the ansatz state (rho) and respective randomly sampled $U^j$'s that have been approximated using random gate sequences. This allows for a tradeoff between gate complexity per sample and the number of samples needed. In some embodiments, this trade-off can be optimized for total complexity, wherein the optimization is performed using convex programming techniques. In contrast to other approaches that include system error (e.g., biased error that cannot be suppressed), the disclosed technique involves unbiased error that can be suppressed by increasing the number of samples run.

When the disclosed technique is applied to ground state estimation, gate complexity and number of samples to run can be tuned to yield the following discussed complexities. Given a Hamiltonian as a linear combination of Pauli operators with total weight (lambda $\lambda$) and an ansatz state (rho $\rho$) with overlap (eta $\eta$) with the ground state, a sample to test can be chosen from $\tilde{O}(\eta^{-2})$ randomly compiled quantum circuits, where $\tilde{O}(\cdot)$ hides polylogarithmic factors. To estimate the ground state energy (or a first excited energy level, second excited energy level, etc.) to within an additive error (delta $\Delta$), each circuit uses one ancilla and at most $\tilde{O}(\lambda^2 \Delta^{-2})$ single-qubit rotations (excluding Clifford gates). In some embodiments, the Hamiltonian may be defined as $$H = \sum_{j=1}^{L} a_j P_j,$$

where L is the number of terms in the Hamiltonian (e.g., the sparsity), $P_j$ are Pauli operators, $a_j$ is a scaling factor for the Pauli operators and is related to the total weight (lambda $\lambda$) as $$\lambda = \sum_{j=1}^{L} |a_j|.$$

As previously discussed, in the disclosed embodiments the runtime is independent of the sparsity L, whereas previous approaches have runtimes that scale with the sparsity L, such that phase estimation for dense Hamiltonians with a large number of terms is inefficient or impossible to complete in a reasonable amount of time. Also, in the disclosed embodiments errors can be statistically suppressed by performing a large number of runs (which was not possible in prior systems that included systemic error). Additionally, only a single ancilla is required per sample which improves upon the qubit costs and gate complexities of prior approaches.

As further discussed below, system error (e.g., biased error) is avoided in the disclosed technique by randomly selecting gates for the randomly compiled Hadamard tests such that the mean value is equal to the cumulative distribution function C(x), which results in an unbiased error.

While embodiments discussed herein focus on estimating ground state energies of a Hamiltonian, in some embodiments the disclosed technique may be used to solve other estimation problems, such as estimating the solution of a linear system of equations. For example, the disclosed technique may be used to generate an output vector, wherein tomography is performed using the output vector to describe a solution of a linear system of equations. Thus, the disclosed technique may be used for phase estimation, and in some embodiments used to find linear combinations of unitaries representing estimation problems that are different from phase estimation problems.

In some embodiments, runs may be massively parallelized across multiple quantum computers to reduce computation time.

Figure 1:
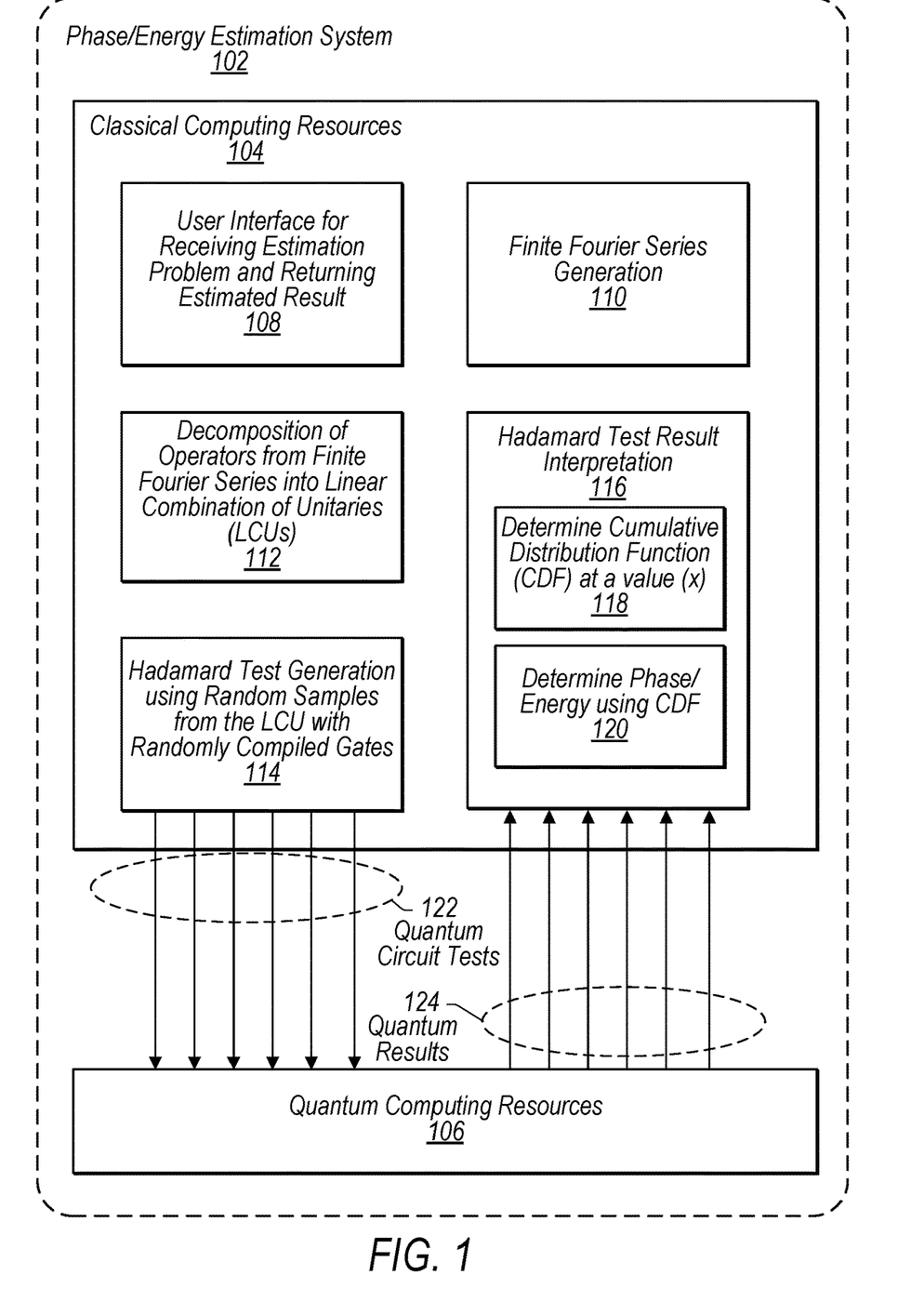
FIG. 1 illustrates a phase/energy level estimation system comprising both classical and quantum computing resources, wherein errors in an estimation generated by the phase/energy level estimation system can be statistically suppressed by increasing runs on the quantum computing resources, according to some embodiments.

FIG. 1 illustrates a phase/energy level estimation system comprising both classical and quantum computing resources, wherein errors in an estimation generated by the phase/energy level estimation system can be statistically suppressed by increasing runs on the quantum computing resources, according to some embodiments.

Figure 6:
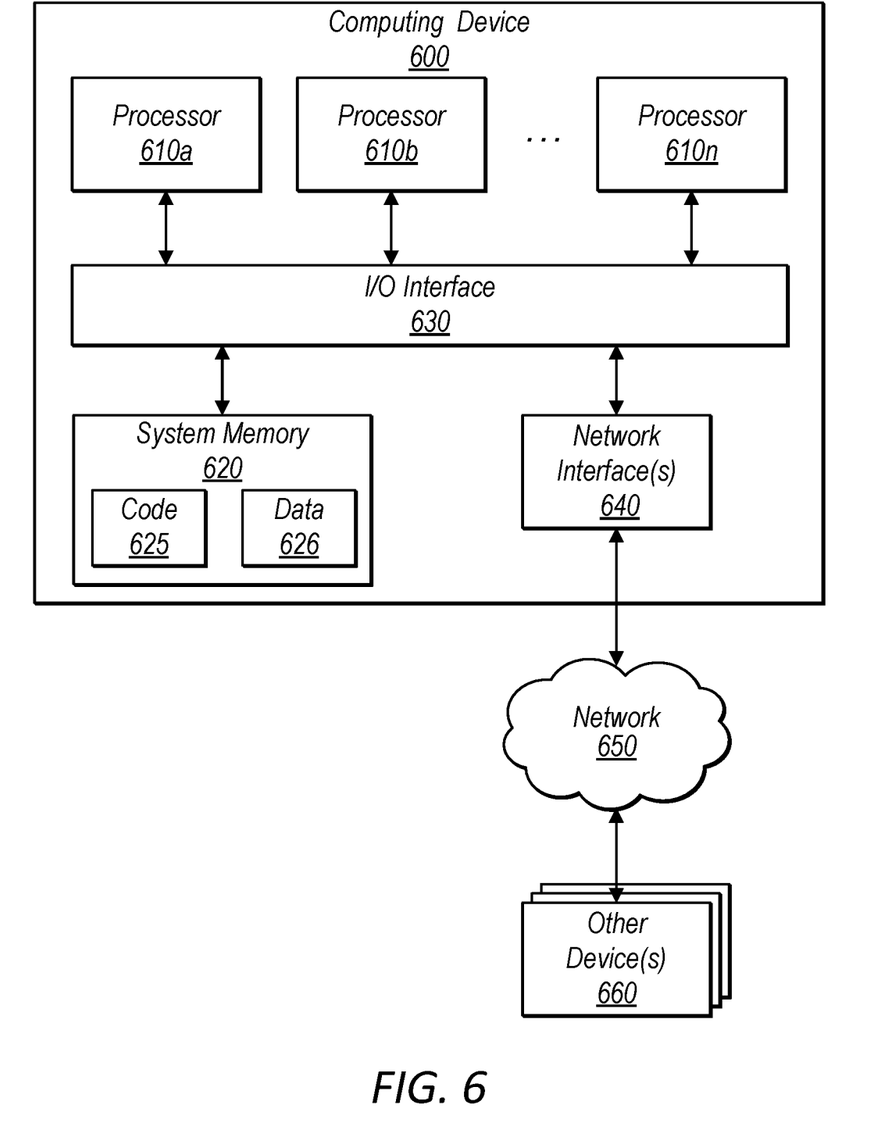
FIG. 6 is a block diagram illustrating an example computing device that may be used in at least some embodiments.

System 102 for estimating phase and/or energy levels includes classical computing resources 104 and quantum computing resources 106. For example, in some embodiments, a quantum computing service, such as quantum computing service 700 shown in FIG. 7 may be used to provide the classical computing resources 104 and the quantum computing resources 108. In some embodiments, various types of quantum computing resources may be used, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, quantum computing devices may encompass at least these three broad categories and/or other types of quantum computing devices.

In some embodiments, the classical computing resources may be implemented using a classical computing device, such as computing device 600 illustrated in FIG. 6. In some embodiments, code stored in a memory of the computing device, such as code 625 stored in system memory 620 may store program instructions for implementing various components of the system 102. For example, such program instructions may implement user interface 108, finite Fourier series generation module 110, operator decomposition module 112, Hadamard test generation module 114, and Hadamard test result interpretation module 116.

Figure 3:
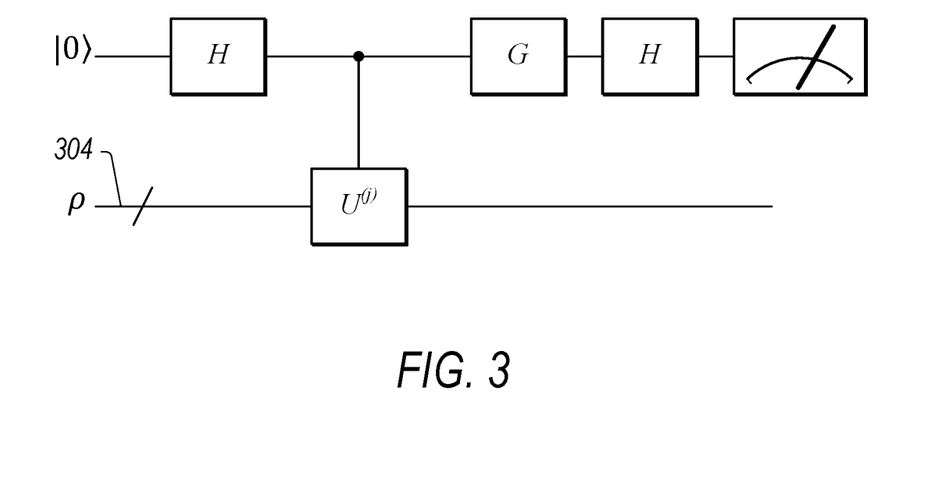
FIG. 3 illustrates an example Hadamard test that may be executed on the quantum computing resources as part of performing the process of FIG. 2, wherein the Hadamard test is a test on an ansatz state (rho) and a unitary ($U^j$) sampled from a linear combination of unitaries as described in FIG. 2, according to some embodiments.
Figure 4:
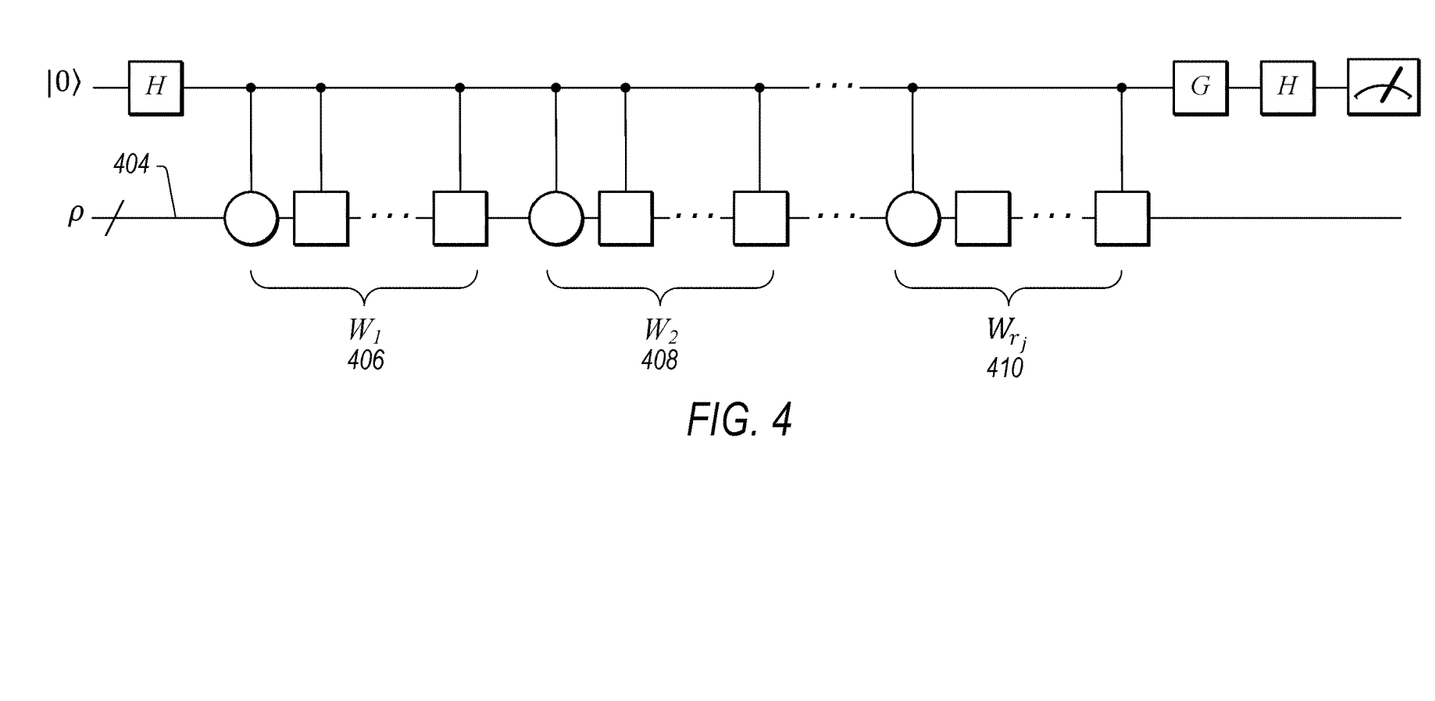
FIG. 4 illustrates example schematics of quantum circuits randomly compiled to perform the Hadamard tests on the ansatz state (rho) and the unitary ($U^j$) as described in FIG. 2, according to some embodiments.

As discussed in more detail below, in some embodiments, a phase estimation problem received from a user via user interface 108 may be converted to a different form. For example, finite Fourier series generation module 110 may generate a finite Fourier series approximation of an operator that projects onto expectation values of an operator (O) for the received problem below a cut-off X. Note that in some embodiments, the operator (O) may be a Hamiltonian (H), but that the disclosed embodiments are not limited to performing energy estimation of Hamiltonians, such that in some embodiments the operator (O) may be something other than a Hamiltonian, such as an operator for a linear system of equations for which the solution is to be estimated. In turn, operators of the finite Fourier series may further be decomposed via decomposition of operators module 112, such that the operators of the finite Fourier series are decomposed into a linear combination of unitaries (LCUs). As discussed herein, the LCUs may be sampled and randomly compiled gates may be used to generate Hadamard test, such as shown in FIG. 3, wherein the ansatz state (rho 304) is tested for a given UM). For example, FIG. 4 illustrates testing ansatz state (rho 404) using quantum circuits 406, 408, and 410. As an example, the squares may represent randomly drawn Pauli operators while circles represent multi-qubit Pauli rotations. It is noted that the number of Pauli operators appearing in each of 406, 408, 410, etc. is random and will be zero with high probability. The Hadamard tests are shown in FIG. 1 as quantum circuit tests 122 being provided to quantum computing resources 106. Results of performing the Hadamard tests (quantum results 124) which will be values of 0 or 1 for each test performed, are provided back to Hadamard test result interpretation module 116, which uses the quantum test results 124 to determine the expectation value/energy level for the estimation problem received via user interface 108. More specifically, cumulative distribution function generation module 118 determines a cumulative distribution function at a value (x) based on the quantum test results 124 and the phase/energy determination module 120 determines one or more respective energy levels of a Hamiltonian or expectation values of a function of an operator (O) based on the cumulative distribution function determined by the cumulative distribution function generation module 118. Additionally, user interface 108 may provide the determined estimation results back to the user or to another system for storage of the results, such as a data storage system of a provider network that includes the phase/energy level estimation system 102.

Figure 2:
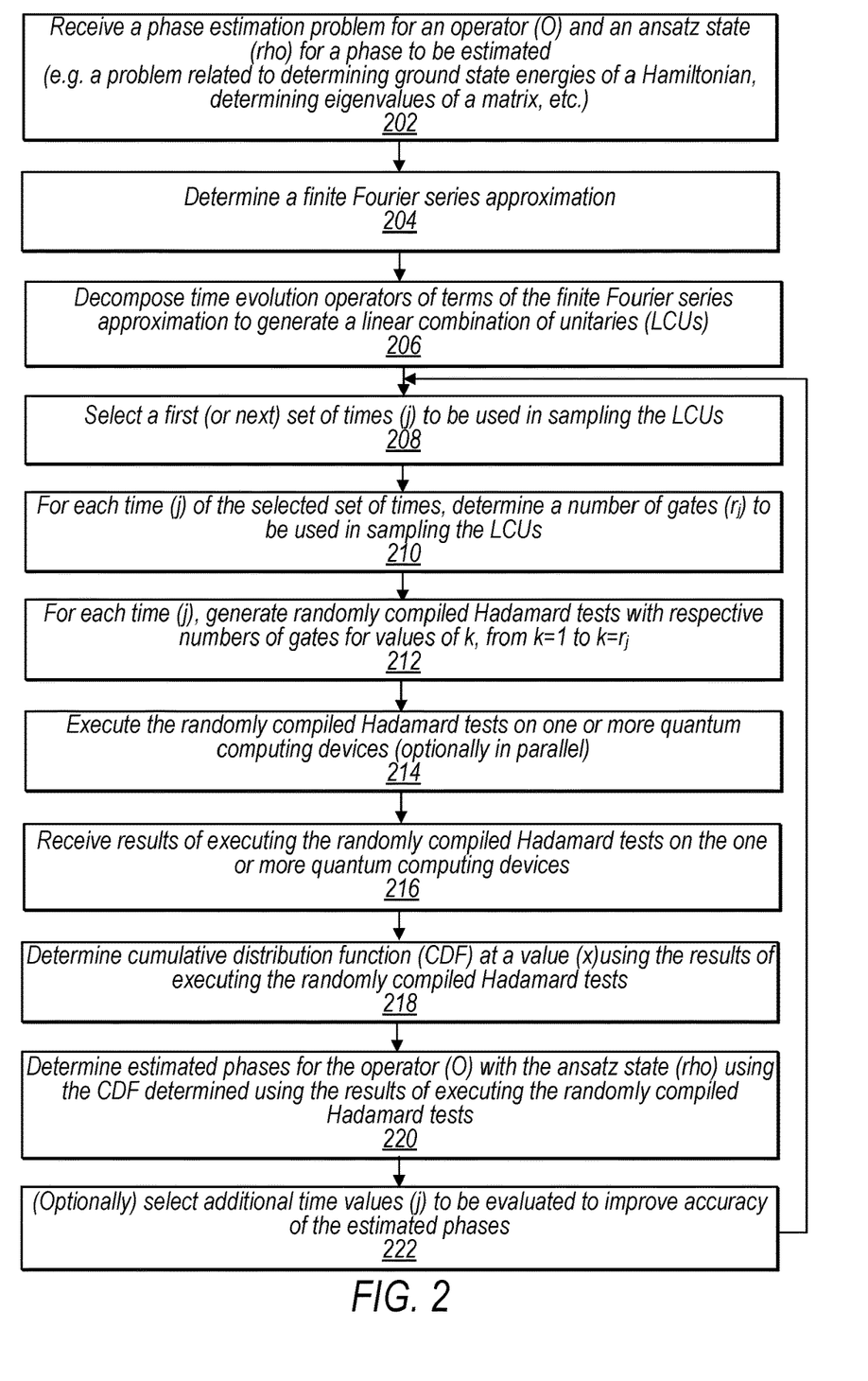
FIG. 2 illustrates a process for estimating a phase/energy level using a system comprising both classical and quantum computing resources, wherein errors in an estimation generated by the system can be statistically suppressed by increasing runs on the quantum computing resources, according to some embodiments.

FIG. 2 illustrates a process for estimating a phase/energy level using a system comprising both classical and quantum computing resources, wherein errors in an estimation generated by the system can be statistically suppressed by increasing runs on the quantum computing resources, according to some embodiments.

At block 202, a phase estimation problem for an operator (O) and an ansatz state (rho) for a phase to be estimated is received. At block 204, a finite Fourier series approximation of an operator that projects onto values of the operator (O) below a cut-off X. At block 206, time evolution operators of terms of the finite Fourier series approximation determined at block 204 are decomposed to generate a linear combination of unitaries (LCUs). At block 208, a first (or next) set of times (j) to be used in sampling the LCUs is selected. At block 210, for each time (j) of the set of times, a number of gates $r_j$ is determined, wherein $r_j$ corresponds to the number of gates to be used when sampling the LCUs. At block, 212, for each time (j) randomly compiled Hadamard tests are generated with respective numbers of gates for values of k, from k=1 to k=rj. Then, at block 214, quantum circuits representing the randomly compiled Hadamard tests, such as quantum circuits as shown in FIG. 4, are executed on a quantum computing resource 106 (as shown by quantum tests 122 in FIG. 1). At block 216 results of the Hadamard test (as shown by quantum results 124 in FIG. 1) are received. At block 218, the results of executing the randomly compiled Hadamard tests are used to determine an approximate cumulative distribution function for the operator (O) with the ansatz state (rho) for a phase to be estimated. At block 220, estimated phases (or energy levels) are determined for the operator with the ansatz state (rho) based on the results of executing the randomly compiled Hadamard tests and based on the approximate cumulative distribution function determined at block 218. At block 222, optionally, additional samples may be run for other j values to reduce error (e.g., statistically suppress error) in the estimated phases (or energy levels). Note that the above description is given in terms of an operator (O) and expectation values that are to be estimated for the operator (O). In some embodiments, a specific example of an operator (O) may be a Hamiltonian, in which case the entity to be estimated is an energy level of the Hamiltonian.

The following discussion provides additional technical details as to the how the system 102 of FIG. 1 and the process shown in FIG. 2 are implemented to perform estimation using a specific example of a Hamiltonian. Though it is noted that in some embodiments, the disclosed techniques may be used for other estimation problems, such as may be used in machine learning.

Assume a Hamiltonian is specified as a linear combination of n-qubit Pauli operators $P_\ell$, then $$H = \sum_{\ell=1}^{L} \alpha_\ell P_\ell,$$

with $$\lambda := \sum_{\ell=1}^{L} |\alpha_\ell|.$$

Consider the problem of coarsely determining whether an ansatz state (rho ρ) has overlap with eigenstates of H with eigenvalues below some threshold. For example, given a threshold $\hat{X}$, precision $\Delta>0$, and overlap parameter $\eta>0$, it may be determined if (A) $tr[\rho \Pi_{\leq \hat{X}-\Delta}]<\eta$ or (B) $tr[\rho \Pi_{\leq \hat{X}+\Delta}]>0$, where $\Pi_{\leq x}$ denotes the projector onto the eigenspaces of H with eigenvalues at most x. Both of these statements may be simultaneously true, in which case either (A) or (B) may be outputted. This may be referred to as eigenvalue thresholding. The solution to such eigenvalue thresholding allows an estimate of the ground state energy to be given when using a suitable ansatz state (rho ρ).

Cumulative Distribution Function (CDF)

The cumulative distribution function (CDF) associated with the Hamiltonian H and the ansatz state (rho ρ) is given as:

$$C(x) := tr\left[\rho \prod_{\leq x/\tau}\right]$$

where $$\tau := \frac{\pi}{2\lambda + \Delta},$$

which is a normalization factor. Then, C(x) can be written as the convolution of $(\rho * \Theta)(x)$ of the Heaviside function $\Theta(\cdot)$ and probability density function $p(\cdot)$ corresponding to $\tau H$ and the ansatz state (rho ρ). This gives $$C(x) = \int_{-\frac{\pi}{2}}^{\frac{\pi}{2}} dy\, p(y)\Theta(x-y)$$

using the fact that p(x) is supported within $$x \in \left(\frac{-\pi}{2}, \frac{\pi}{2}\right),$$

since $\tau\|H\| \leq \tau\lambda < \pi/2$. Eigenvalue thresholding then reduces the following problem about the CDF. This allows $\Theta(x)$ to be replaced with a periodic function that is a good approximation on $x \in (-\pi, \pi)$.

Problem 1:

For given $x \in [-\tau\lambda, \tau\lambda]$ and $\delta>0$, determine whether $C(x-\delta)<\eta$ or $C(x+\delta)>0$, outputting either statement if both are true. In particular solving problem 1 for $x=\tau\hat{X}$ and $\delta=\tau\Delta$ solves eigenvalue thresholding.

Approximate Cumulative Distribution Function (Approximate CDF)

To solve problem 1, an approximate cumulative distribution function can be determined, where the approximation is represented by $\tilde{C}(\cdot)$ as compared to the ideal CDF $C(\cdot)$, satisfying $$C(x-\delta)-\varepsilon \leq \tilde{C}(X) \leq C(x+\delta)+\varepsilon$$

for relevant values of x, $\delta$, and $\varepsilon$.

The algorithm described herein is based on expressing C(x) in terms of a linear combination of computationally simple unitaries, which are arrived at via a two-step construction. First, an improved Fourier series is developed for approximation to the Heaviside function (Lemma 1). Second, this is combined with a novel decomposition of the time-evolution operators (Lemma 2) in the relevant Fourier series. Randomly sampling unitaries from such a decomposition and estimating their expectation values using Hadamard tests as in FIG. 3 will gives estimates for (x) that allow Problem 1 to be solved with high probability.

Fourier Series Approximation

An approximate CDF for $\tilde{C}(\cdot)$ is obtained by replacing $\Theta(\cdot)$ with a finite Fourier series approximation thereof. A Fourier series is used with small approximation error on $|x| \in [\delta, \pi-\delta]$ for fixed $\delta>0$, small total weight of Fourier coefficients, and small maximal time parameter Iti in the terms of $e^{itx}$.

Lemma 1

For any $\varepsilon>0$ and $\delta \in (0, \pi/2)$, the Fourier series $F(x)=\Sigma_{j \in S_1} F_j e^{ijx}$ with $$S_1 := \{0\} \cup \{\pm(2j+1)\}_{j=0}^{d}$$

and d=$\mathcal{O}(\delta^{-1} \log(\varepsilon^{-1}))$ satisfies:

$$|F(x)-\Theta(x)| \leq \varepsilon \forall x \in [-\pi+\delta, -\delta] \cup [\delta, \pi-\delta] \quad (1)$$

$$-\varepsilon \leq |F(x)| \leq 1+\varepsilon \forall x \in \mathbb{R} \quad (2)$$

$$\mathcal{F} := \Sigma_{j \in S_1} |F_j| = \mathcal{O}(\log(d)). \quad (3)$$

The Fourier series of Lemma 1 is used to obtain the approximate cumulative distribution function (approximate CDF).

$$\tilde{C}(x) := \int_{-\frac{\pi}{2}}^{\frac{\pi}{2}} dy\, p(y)F(x-y) = \sum_{j \in S_1} F_j e^{ijx} tr\left[\rho e^{i\hat{H}t_j}\right]$$

with $t_j := -j\tau\lambda$ and $\hat{H} := H/\tau$.

Linear Combination of Unitaries (LCU) Decomposition of the Time-Evolution Operator Instead of directly implementing the time-evolution operator $e^{i\hat{H}t_j}$ in Hadamard tests, the disclosed technique decomposes those terms into a specific linear combination of unitaries.

Lemma 2

Let $\hat{H} = \Sigma_\ell p_\ell P_\ell$ be a Hermitian operator that is specified as a convex combination of Pauli operators. For any $t \in \mathbb{R}$ and $r \in \mathbb{N}$ there exists a linear decomposition $$e^{iHt} = \sum_{k \in S_2} b_k U_k$$

for some index set $S_2$, where $b_k > 0$ and $U_k$ are unitary, with total weight $$\sum_{k \in S_2} b_k \leq \exp\left(\frac{t^2}{r}\right),$$

such that for all $k \in S_2$, the non-Clifford cost of controlled $U_k$ is that of r controlled single-qubit Pauli rotations.

This decomposition is conceptually different from previous LCU methods. The purpose of Lemma 2 is to allow for a trade-off between the sample complexity and gate complexity of the disclosed algorithm. Specifically, as shown in the next subsection, the sample complexity depends on the total weight of the coefficients in the disclosed decomposition. Since this scales with r as exp ($t^2/r$), the sample complexity can be reduced by increasing r, at the cost of increasing the gate complexity per sample, and vice versa.

Main Algorithm

Lemma 2 is applied to decompose each $e^{iHt_j}$ term as $e^{iHt_j} = \sum_{k \in S_2} b_k^{(j)} U_k^{(j)}$. A positive integer $r_j$ is chosen for each $j \in S_1$ and a corresponding runtime vector is defined as $\vec{r} = (r_j)_j \in \mathbb{N}^{S_1}$. This leads to a final decomposition $$\tilde{C}(x) = \sum_{(j,k) \in S_1 \times S_2} F_j e^{ijx} b_k^{(j)} tr[\rho U_k^{(j)}]$$

with total weight $$\mathcal{A}(\vec{r}) := \sum_{(j,k) \in S_1 \times S_2} |a_{jk}| \leq \sum_{j \in S_1} |F_j| \exp(t_j^2 / r_j).$$

Recall that problem 1 can be solved by determining if $\tilde{C}(x) < \eta - \varepsilon$ or $\tilde{C}(x) > \varepsilon$. To estimate $\tilde{C}(x)$, the disclosed technique samples (j,k) from $S_1 \times S_2$ with probability proportional to $|a_{jk}|$ and performs a Hadamard test on the ansatz state (rho $\rho$) and $$U_k^{(j)},$$

obtaining an estimate $$m_{jk} \cdot \text{for } tr[\rho U_k^{(j)}].$$

Then $z_{jk} := \mathcal{A}(\vec{r}) e^{i \arg(a_{jk})} m_{jk}$ is an unbiased estimate for $\tilde{C}(x)$. Letting $\bar{Z}$ denote the random variable obtained by taking the average of $\mathcal{C}_{sample}$ of such estimates, it follows from Hoeffding's inequality that guessing $\tilde{C}(x) < \eta - \varepsilon$ if $\text{Re}[\bar{Z}] < \eta/2$ and $\tilde{C}(x) > \varepsilon$ if $\text{Re}[\bar{Z}] \geq \eta/2$ gives a correct answer with probability at least $1 - \upsilon$ provided that $$\mathcal{C}_{sample} \geq 4\mathcal{A}(\vec{r})^2 \left(\frac{\eta}{2} - \varepsilon\right)^{-2} \ln(\upsilon^{-1}).$$

Example Algorithm 1 for Problem 1
Problem inputs: a Hamiltonian $$H = \sum_{\ell=1}^L \alpha_\ell P_\ell, \text{ with } \alpha_\ell > 0 \text{ and } \lambda = \sum_{\ell=1}^L \alpha_\ell,$$

an ansatz state (rho $\rho$), a precision parameter $$\Delta > 0, \text{ and } \tau := \frac{\pi}{2\lambda + \Delta}.$$

Algorithm parameters: real numbers $x \in [-\tau\lambda, \tau\lambda]$, $\delta \in (0, \tau\lambda]$, $\eta \in (0, 1]$, and $\varepsilon \in (0, \eta/2)$, a probability $\upsilon$.

Output: output 0 if $C(x-\delta) < \eta$; and output 1 if $C(x+\delta) > 0$, and output either 0 or 1 if both are true—where $C(\cdot)$ is the cumulative distribution function defined above (e.g., $C(x) := tr[\rho \Pi_{\leq x/\tau}]$) with probability of error at most $\upsilon$.

Steps:
1: Compute the coefficients $\{F_j\}_{j \in S_1}$ specified below for the Fourier series from Lemma 1 with approximation parameters $\delta$ and $\varepsilon$. Set $t_j \leftarrow -j\lambda\tau \forall j \in S_1$. Wherein the coefficients are given by:

$$F_{\beta,d}(x) = F_0 + \sum_{j=0}^d F_{2j+1} \left[e^{i(2j+1)x} - e^{-i(2j+1)x}\right]$$

with $$F_0 := \frac{1}{2}, F_{2j+1} := -i\sqrt{\frac{\beta}{2\pi}} e^{-\beta} \frac{I_j(\beta) + I_{j+1}(\beta)}{2j+1} \text{ for } 0 \leq j \leq d-1,$$

$$F_{2d+1} := -i\sqrt{\frac{\beta}{2\pi}} e^{-\beta} \frac{I_d(\beta)}{2d+1}.$$

The above Fourier series can be made an arbitrarily good approximation to the Heaviside function $\Theta(x)$ on $x \in [-\pi, \pi]$ by choosing appropriate values for the parameters $\beta \in \mathbb{R}_{>0}$ and $d \in \mathbb{N}$. Here and throughout, $I_n(\cdot)$ denotes the nth Bessel function of the first kind.

2: Choose a runtime vector $\vec{r} \in \mathbb{N}^{S_1}$ and apply Lemma 2. The runtime vector can be chosen using the equation:

$$r_j = 2t_j^2 \forall j \in S_1 \text{ gives } \mathcal{A}(\vec{r}) \leq \sqrt{e} \mathcal{F}$$

This yields a decomposing and total weight as discussed above.

3:

$$\mathcal{C}_{sample}(\vec{r}) \leftarrow \left\lceil \left(\frac{2\mathcal{A}(\vec{r})}{\eta/2 - \varepsilon}\right)^2 \ln\frac{1}{\upsilon} \right\rceil.$$

4: FOR i=1, ..., $\mathcal{C}_{sample}(\vec{r})$:
5: Sample a unitary $U_k^{(j)}$ from the final decomposition $$\tilde{C}(x) = \sum_{(j,k) \in S_1 \times S_2} F_j e^{ijx} b_k^{(j)} tr[\rho U_k^{(j)}]$$

a. Sample an index $j \in S_1$ with probability $\propto |F_j|$.
b. Sample a unitary using Algorithm 2 (described below) with inputs $H/\lambda$, $t_j, r_j$.
6: Perform a Hadamard test with inputs the ansatz state (rho $\rho$) and $$U_k^{(j)},$$

obtaining an estimate $m_i$ of $$tr[\rho U_k^{(j)}].$$

7: $z_i \leftarrow \mathcal{A}(\vec{r}) e^{i(arg(F_j)+jx)} m_i$
8: $\bar{z} \leftarrow \Sigma_i z_i / \mathcal{C}_{sample}(\vec{r})$. If $Re(\bar{z}) < \eta/2$, return 0. Else, return 1.

Example Algorithm 2 for Efficiently Sampling from the LCU Decomposition of Lemma 2
Input: a Hamiltonian $$\hat{H} = \sum_{\ell=1}^{L} p_\ell P_\ell$$

specified as a convex combination of Pauli operators, a real number t, a positive integer r.
Output: Description of random unitary U, such that $\mathbb{E}[U] \propto e^{i\hat{H}t}$ and U can be implemented using r controlled single-qubit Pauli rotations.
Steps:
1: vLIST$\leftarrow$( ).
2: Do r times:
3: Sample an even positive integer n with probability $$q_n \propto \frac{(t/r)^n}{n!} \sqrt{1 + \left(\frac{t/r}{n+1}\right)^2}$$

4: Independently sample n+1 indices $\ell_0, \ldots, \ell_n$ from $$\{p_\ell\}_{\ell=1}^{L}$$

5: Append $e^{i\theta_n P_{\ell_0}}$ to vLIST, where $$\theta_n := \arccos\left(\left[1 + \left(\frac{t/r}{n+1}\right)^2\right]^{-1/2}\right)$$

6: Append $P_{\ell_1}, \ldots, P_{\ell_n}$ to vLIST
7: Append $(i \, sgn(t))^n \mathbb{1}$ to vLIST
8: RETURN U=vLIST[l] ... vLIST[2] vLIST[1], where l=length(vLIST).

A few comments on the above algorithms. The Hadamard test in step 6 of Algorithm 1 is the sole quantum routine and involves two circuits on n+1 qubits, for an n-qubit Hamiltonian H. The expected number of controlled single-qubit Pauli rotations per circuit is $$C_{gate}(\vec{r}) := \frac{1}{\mathcal{A}(\vec{r})} \sum_{(j,k) \in S_1 \times S_2} |a_{jk}| r_j$$

plus the cost of preparing the ansatz state (rho $\rho$). Step 6 of Algorithm 1 is prepared $\mathcal{C}_{sample}(\vec{r})$ times, so the expected total non-Clifford complexity is $2\mathcal{C}_{sample}(\vec{r}) \cdot \mathcal{C}_{gate}(\vec{r})$.

Under appropriate assumptions on the Hamiltonian H and ansatz state (rho $\rho$), the disclosed technique for estimating the CDF can be adapted to perform phase estimation. Specifically, eigenvalues of H correspond to the locations of jump discontinuities in C(x), and these locations can be estimated given sufficient knowledge about the overlap of $\rho$ with relevant eigenspaces. For simplicity, the problem may be restricted to the problem of estimating the ground state energy $[H]_{min}$, which only requires the standard promise that $tr[\rho \Pi_{min}] \geq \eta$ for some $\eta > 0$, where $\Pi_{min}$ denotes the projector onto the ground space of H. It is noted that in using algorithm 1 to solve problem 1 the samples collected in step 6 can be collected for all of the different x values, with only a small overhead in the sample complexity. Namely, since Algorithm 1 errs with probability at most v for any x, choosing $$v = \frac{\xi}{s}$$

with probability at least $1-\xi$.
Theorem 1
For any n-qubit Hamiltonian H of the form $$H = \sum_{\ell=1}^{L} \alpha_\ell P_\ell,$$

with $$\lambda := \sum_{\ell=1}^{L} |\alpha_\ell|,$$

let $\rho$ be a state that has overlap $tr[\rho \Pi_{min}] \geq \eta$ with the ground space of H. Then, the ground state energy of H can be estimated to within additive error $\Delta$ with probability at least $1-\xi$ using $$O\left(\frac{1}{\eta^2} \log^2\left(\frac{\lambda}{\Delta} \log \frac{1}{\eta}\right) \log\left(\frac{\log(\lambda/\Delta)}{\xi}\right)\right)$$

quantum circuits on n+1 qubits. Each circuit uses one copy of $\rho$ and at $$O\left(\frac{\lambda^2}{\Delta^2} \log^2 \frac{1}{\eta}\right)$$

controlled single-qubit rotations.

Thus, the quantum complexities are independent of the Hamiltonian sparsity L, at the price of the quadratic dependence $\tilde{O}(\lambda^2 \Delta^{-2} \eta^{-2})$ for the total number of gates. This is in contrast to standard results of phase estimation, which have much greater quantum complexities.

Examples in Quantum Chemistry

Figure 5:
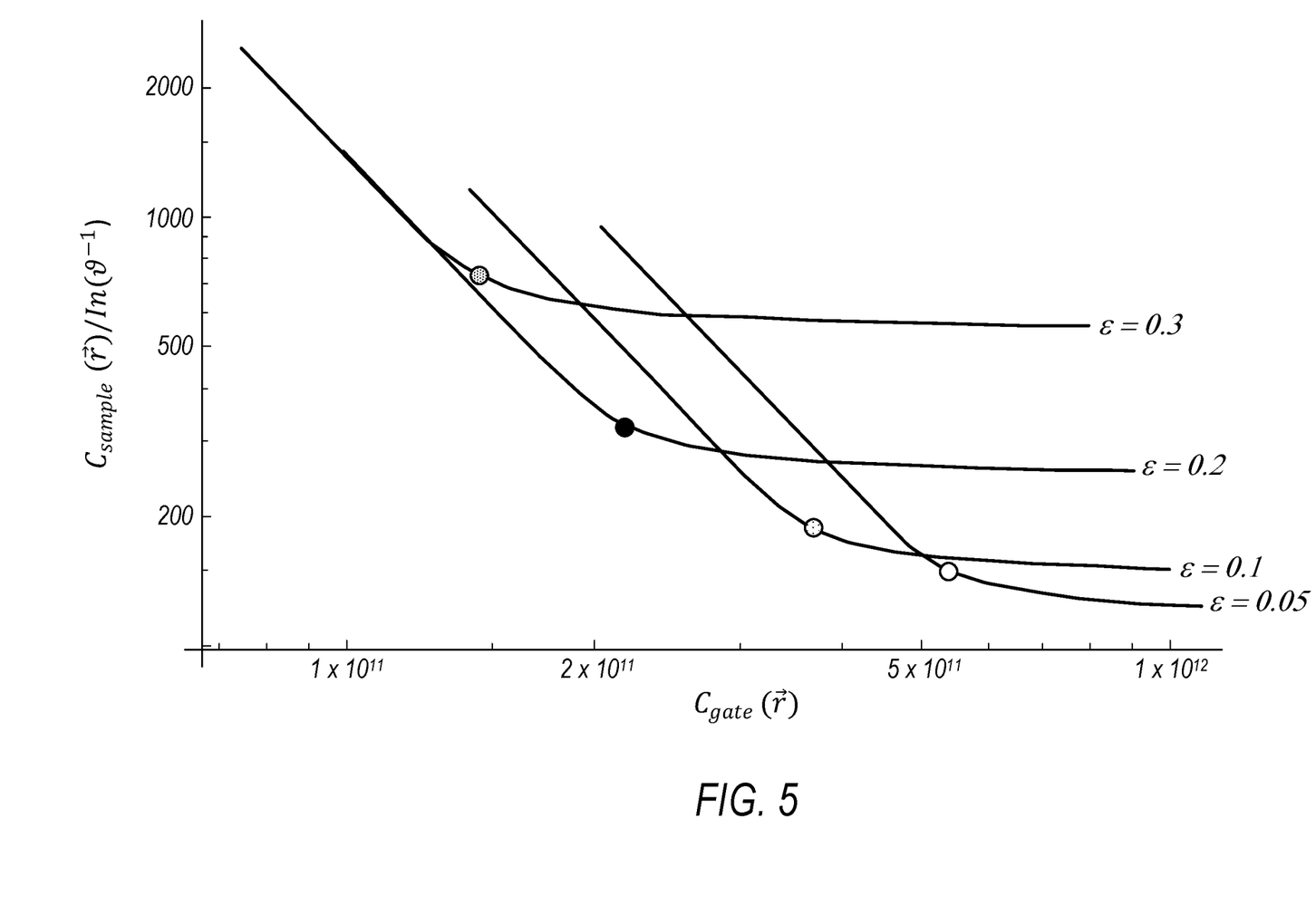
FIG. 5 illustrates a log-log plot for various choices of r, according to some embodiments.

In some embodiments, the above disclosed techniques may be used to estimate energy states of hydrogen chains. Also, the above disclosed techniques may be used to analyze the FeMoco benchmark. FIG. 5 illustrates a log-log plot of $\mathcal{C}_{sample}(\vec{r})/\ln(\upsilon^{-1})$ vs. $\mathcal{C}_{gate}(\vec{r})$ for $\lambda=1511$ (FeMoco), $\Delta=0.0016$ (chemical accuracy), $\eta=1$, and $\varepsilon=\{0.05, 0.1, 0.2, 0.3\}$ for various choices of r. Dots indicate the values that optimize the total expected complexity $2\mathcal{C}_{sample}(\vec{r}) \cdot \mathcal{C}_{gate}$ (i), while curves are obtained by fixing $\mathcal{C}_{gate}(\vec{r})$ and optimizing the sample complexity. To calculate the total number of samples needed to guarantee an overall failure probability of at most $\xi$ for ground state energy estimation (Theorem 1), one would multiply they-axis by $\ln(\upsilon^{-1})= \mathcal{O}(\log(\xi^{-1})+\log\log((\delta^{-1}))$. As an example, $\xi=0.1$ would give a multiplier of approximately 6.

Illustrative Computer System

FIG. 6 is a block diagram illustrating an example computing device that may be used in at least some embodiments.

FIG. 6 illustrates such a general-purpose computing device 600 as may be used in any of the embodiments described herein. In the illustrated embodiment, computing device 600 includes one or more processors 610 coupled to a system memory 620 (which may comprise both non-volatile and volatile memory modules) via an input/output (I/O) interface 630. Computing device 600 further includes a network interface 640 coupled to I/O interface 630.

In various embodiments, computing device 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. In some implementations, graphics processing units (GPUs) may be used instead of, or in addition to, conventional processors.

System memory 620 may be configured to store instructions and data accessible by processor(s) 610. In at least some embodiments, the system memory 620 may comprise both volatile and non-volatile portions; in other embodiments, only volatile memory may be used. In various embodiments, the volatile portion of system memory 620 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 620 as code 625 and data 626.

In some embodiments, I/O interface 630 may be configured to coordinate I/O traffic between processor 610, system memory 620, and any peripheral devices in the device, including network interface 640 or other peripheral interfaces such as various types of persistent and/or volatile storage devices. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other devices 660 attached to a network or networks 650, such as other computer systems or devices as illustrated in FIG. 1 through FIG. 7, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may represent one embodiment of a computer-accessible medium configured to store at least a subset of program instructions and data used for implementing the methods and apparatus discussed in the context of FIG. 1 through FIG. 7. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 600 via I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Figure 7:
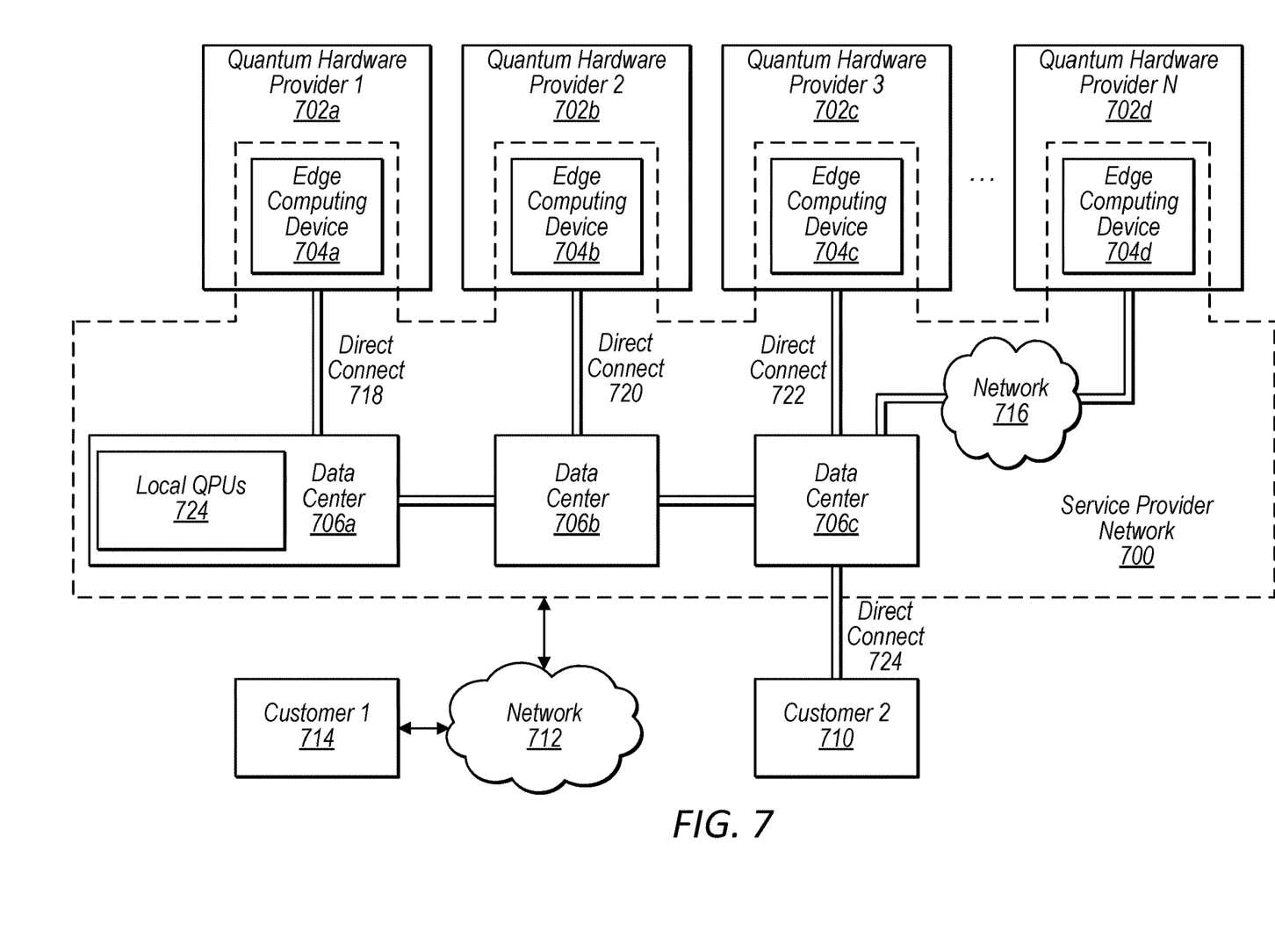
FIG. 7 illustrates an example provider network that includes both classical computing resources and quantum computing resources that may be used to implement a phase/energy level estimation system, according to some embodiments.

Illustrative Service Provider Network Comprising Quantum Computing and Classical Computing Resources FIG. 7 illustrates edge computing devices of a quantum computing service physically located at quantum hardware provider locations, according to some embodiments.

In some embodiments, service provider network 700, as illustrated in FIG. 7, may include one or more data centers connected to each other via private or public network connections. Also, edge computing devices located at quantum hardware provider locations may be connected to a service provider network via private or public network connections. For example, service provider network 700 illustrated in FIG. 7 includes data centers 706a, 706b, and 706c that are connected to one another via private physical network links of the service provider network 700. In some embodiments, a customer of the service provider network may also be connected via a private physical network link that is not available to the public to carry network traffic, such as a physical connection at a router co-location facility. For example, customer 710 is connected to a router associated with data center 706c via direct connection 724. In a similar manner, edge computing devices located at quantum hardware provider locations may be connected to a service provider network via a private physical network link that is not available to carry public network traffic.

For example, edge computing device 704a located at quantum hardware provider location 702a is connected to a router at data center 706a via direct connection 718. In a similar manner, edge computing device 704b at quantum hardware provider location 702b is connected to a router at data center 706b via direct connection 720. Also, edge computing device 704c at quantum hardware provider 702c is connected to a router at data center 706c via direct connection 722.

Also, in some embodiments an edge computing device of a service provider network located at a quantum hardware provider location may be connected to the service provider network via a logically isolated network connection over a shared network connection, such as via the Internet or another public network. For example, edge computing device 704d at quantum hardware provider location 702d is connected to data center 706c via a logically isolated network connection via network 716. In a similar manner, in some embodiments a customer, such as customer 714, may be connected to service provider network 700 via public network 712.

In some embodiments, a quantum computing service such as quantum computing service, may be implemented using one or more computing devices in any of data centers 706a, 706b, 706c, etc. Also, the quantum computing service, may provide customers, such as customer 714 or customer 710, access to quantum computers in any of quantum hardware provider locations 702a, 702b, 702c, 702d, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology-based quantum computers.

In some embodiments, one or more of the data centers 706 may also include local quantum hardware devices, such as local QPUs 726.

In some embodiments, a quantum computing service as described in FIG. 7 may be used to implement classical computing resources 104 and quantum computing resources 106 of phase/energy level estimation system 102 as described in FIG. 1. Also, such a system may be used to carry out the process as shown in FIG. 2 and various other ones of the techniques described herein that involve both classical and quantum computing resources.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system for estimating one or more energy levels of a Hamiltonian (H) describing a physical system, the system comprising:
one or more memories storing program instructions for implementing a quantum algorithm to estimate the one or more energy levels;
a quantum computing device; and
one or more classical computing processors;
wherein the program instructions, when executed using the one or more classical computing processors causes the one or more classical computing processors to:
receive a Hamiltonian and an ansatz state (rho ($\rho$));
determine a finite Fourier series approximation of an operator that projects onto energy levels of the Hamiltonian below a cut-off X;
decompose time evolution operators of terms of the finite Fourier series into respective linear combinations of unitaries (respective LCUs), wherein the decomposition gives an approximated cumulative distribution function ($\tilde{C}(x)$), wherein $$\tilde{C}(x) = \sum_{(j,k) \in S_1 \times S_2} a_{jk} tr[\rho U_{(k)}^j] \approx e^{iHt},$$

wherein j corresponds to a runtime and k corresponds to respective terms of the respective LCUs for a given runtime j;

randomly select a given time j;

determine based on the selected value of j a number of gates ($r_j$) to be used;

wherein the program instructions, when executed further cause the quantum computing device to:

for each selected time j:

for each value of k from 1 to the determined number of gates ($r_j$) for the selected time j:

execute, on the quantum computing device, a randomly compiled Hadamard test using randomly compiled gates implemented on hardware of the quantum computing device for respective values of k, and wherein the program instruction, when executed using the one or more classical computing processors, further cause the one or more classical computing processors to:

receive results of executing the randomly compiled Hadamard tests; and determine the estimated one or more energy levels of the Hamiltonian based on the results of executing the randomly compiled Hadamard tests.

2. The system of claim 1, wherein to randomly select the time j, the program instructions further cause the one or more classical computing processors to:

determine a probability distribution for a set of times j and randomly select the time j based on weighted probabilities.

3. The system of claim 1, wherein an amount of time required to perform the estimation of the one or more energy levels of the Hamiltonian is independent of a number of terms included in the Hamiltonian.

4. The system of claim 1, wherein errors in the estimation of the one or more energy levels of the Hamiltonian is unbiased such that increasing a number of times (j) or a number of gates ($r_j$) for which the randomly compiled Hadamard test is performed reduces overall error in the determined estimated one or more energy levels of the Hamiltonian.

5. The system of claim 1, wherein respective quantum circuits for executing the randomly compiled Hadamard test are implemented using:

a number of qubits equal to a number of qubits in the Hamiltonian and no more than one additional ancilla qubit.

6. The system of claim 1, wherein the Hamiltonian is an operator given in a Pauli basis.

7. A method of estimating a value for an operator (O), the method comprising:

receive an operator (O) and an ansatz state (rho ($\rho$)) for the value of the operator (O) to be estimated;

determining a finite Fourier series approximation of an operator that projects onto expectation values of the operator (O) below a cut-off X;

decomposing time evolution operators of terms of the finite Fourier series into respective linear combinations of unitaries (respective LCUs), wherein the decomposition gives an approximated cumulative distribution function $(\tilde{C}(x))$, wherein $\tilde{C}(x) = \sum_{(j,k) \in S_1 \times S_2} a_{jk} tr[pU^j_{(k)}]$, wherein j corresponds to a runtime and k corresponds to respective terms of the respective LCUs for a given runtime j;

selecting a given time j;

determining based on the selected value of j a number of gates ($r_j$) to be used;

causing a quantum computing device to:

for each selected time j:

for each value of k from 1 to the determined number of gates ($r_j$) for the selected time j:

execute, on the quantum computing device, a randomly compiled Hadamard test using randomly compiled gates implemented on hardware of the quantum computing device for respective values of k ;

receiving, from the quantum computing device, results of executing the randomly compiled Hadamard tests; and determining the value for the operator (O) based on the results of executing the randomly compiled Hadamard tests.

8. The method of claim 7, further comprising:

determining a probability distribution for a set of times j; and wherein said selecting the given time j is performed such that the given time j is randomly selected based on the probability distribution for the set of times j.

9. The method of claim 7, further comprising:

determining an acceptable level of error in the estimated value of the operator (O); and repeating:

said selecting a given time j for other j values, said determining a number of gates for the other j values; and said causing the quantum computing device to execute randomly compiled Hadamard tests for compiled gates for the other j values;

wherein said repeating is performed for a number of the other j values such that the estimated value of the operator (O) has an associated error value equal to or less than the determined acceptable level of error.

10. The method of claim 7, wherein an amount of time required to perform the estimation of the value of the operator (O) is independent of a number of terms included in the operator (O).

11. The method of claim 7, wherein errors in the estimation of the value of the operator (O) are unbiased such that increasing a number of times (j) or a number of gates ($r_j$) for which the randomly compiled Hadamard test is executed reduces overall error in the determined estimated value.

12. The method of claim 7, wherein respective quantum circuits for executing the randomly compiled Hadamard test are implemented using:

a number of qubits equal to a number of qubits in the operator (O) and no more than one additional ancilla qubit.

13. The method of claim 7, wherein the operator (O) is defined in a Pauli basis.

14. The method of claim 8, further comprising:

selecting another j value, determining a number of gates for the other j value; and causing another quantum computing device to execute randomly compiled Hadamard tests for compiled gates for the other j value;

wherein the quantum computing device and the other quantum computing device execute quantum circuits in parallel to execute the randomly compiled Hadamard tests.

15. The method of claim 8, wherein the operator (O) is a Hamiltonian and wherein the estimated value is a ground state energy of the Hamiltonian.

16. The method of claim 8, wherein the estimation of the value of the operator (O) is used for finding linear combinations for unitaries (LCUs) representing estimation problems different from phase estimation, wherein at least one of the estimation problems is performing tomography on an output vector describing a solution of a linear system of equations.

17. One or more non-transitory, computer-readable media storing program instructions, that when executed using one or more processors, cause the one or more processors to:
receive an operator (O) and an ansatz state (rho ($\rho$)) for a value of the operator (O) to be estimated;
determine a finite Fourier series approximation of an operator that projects onto expectation values of the operator (O) below a cut-off X;
decompose time evolution operators of terms of the finite Fourier series into respective linear combinations of unitaries (respective LCUs), wherein the decomposition gives an approximated cumulative distribution function $(\tilde{C}(x))$, wherein $\tilde{C}(x) = \sum_{(j,k) \in S_1 \times S_2} a_{jk} tr[p U_{(k)}^j]$, wherein j corresponds to a runtime and k corresponds to respective terms of the respective LCUs for a given runtime j;
determine based on a selected value of j a number of gates ($r_j$) to be used;
cause a quantum computing device to:
for each selected time j:
for each value of k from 1 to the determined number of gates ($r_j$) for the selected time j:
execute, on the quantum computing device, a Hadamard test using randomly compiled gates implemented on hardware of the quantum computing device for respective values of k;
receive, from the quantum computing device: results of executing the randomly compiled Hadamard tests; and
determine the estimated value for the operator (O) based on the results of executing the randomly compiled Hadamard tests.

18. The one or more non-transitory, computer-readable media of claim 17, wherein an amount of time required to perform the estimation of the value of the operator (O) is independent of a number of terms included in the operator (O).

19. The one or more non-transitory, computer-readable media of claim 18, wherein the operator (O) is a Hamiltonian, and wherein the value is a ground state energy of the Hamiltonian.

20. The one or more non-transitory, computer-readable media of claim 17, wherein errors in the estimation of the value of the operator (O) is unbiased such that increasing a number of times (j) or a number of gates ($r_j$) for which the randomly compiled Hadamard test is executed reduces overall error in the determined estimated value of the operator (O).

* * * * *